United States Patent
Parthasarathy et al.

(10) Patent No.: US 10,783,449 B2
(45) Date of Patent: Sep. 22, 2020

(54) CONTINUAL LEARNING IN SLOWLY-VARYING ENVIRONMENTS

(71) Applicant: SAMSUNG SDS AMERICA, INC., Ridgefield Park, NJ (US)

(72) Inventors: Kannan Parthasarathy, Palo Alto, CA (US); Girish Kathalagiri Somashekariah, Santa Clara, CA (US); John Francis Arackaparambil, Foster City, CA (US)

(73) Assignee: SAMSUNG SDS AMERICA, INC., Ridgefield Park, NJ (US)

( * ) Notice: Subject to any disclaimer, the term of this patent is extended or adjusted under 35 U.S.C. 154(b) by 725 days.

(21) Appl. No.: 15/290,409

(22) Filed: Oct. 11, 2016

(65) Prior Publication Data

US 2017/0103341 A1    Apr. 13, 2017

Related U.S. Application Data

(60) Provisional application No. 62/388,821, filed on Oct. 8, 2015.

(51) Int. Cl.
  *G06N 20/00*   (2019.01)
(52) U.S. Cl.
  CPC .................. *G06N 20/00* (2019.01)
(58) Field of Classification Search
  CPC ............................ G06N 20/00; G06N 99/005
  See application file for complete search history.

(56) References Cited

U.S. PATENT DOCUMENTS

| | | | | |
|---|---|---|---|---|
| 6,311,144 B1* | 10/2001 | Abu El Ata | ............ | G06F 17/10 703/2 |
| 2008/0208786 A1 | 8/2008 | Serrano-Morales et al. | | |
| 2014/0156566 A1* | 6/2014 | Kabiljo | .................. | G06Q 30/02 706/12 |
| 2014/0156568 A1 | 6/2014 | Ganguly et al. | | |
| 2015/0142713 A1* | 5/2015 | Gopinathan | ........... | G06Q 10/00 706/14 |
| 2015/0293964 A1* | 10/2015 | Morfonios | .............. | H04L 43/04 707/753 |
| 2016/0132787 A1* | 5/2016 | Drevo | .................... | G06N 20/00 706/12 |

OTHER PUBLICATIONS

Hoffman, Matthew, Bobak Shahriari, and Nando Freitas. "On correlation and budget constraints in model-based bandit optimization with application to automatic machine learning." Artificial Intelligence and Statistics. 2014. (Year: 2014).*

(Continued)

*Primary Examiner* — Eric Nilsson
(74) *Attorney, Agent, or Firm* — Sughrue Mion, PLLC

(57) ABSTRACT

An approach for continual learning in slowly-varying environments is provided. The approach receives one or more action requests from a decision agent. The approach deploys a first model to a decision engine. The approach initiates an observation period. The approach builds a second model, in which the second model comprises collected transaction data from the observation period. The approach initiates a test period. The approach determines a performance score for the first model and a performance score for the second model. The approach selects the model providing an optimized action.

14 Claims, 3 Drawing Sheets

(56) References Cited

OTHER PUBLICATIONS

Written Opinion of the International Searching Authority, dated Jan. 9, 2017, in counterpart International Application No. PCT/US2016/056419, 4 pages.
Notification of Transmittal of the International Search Report and the Written Opinion of hte International Searching Authority, or the Declaration, dated Jan. 9, 2017, in counterpart International Application No. PCT/US2016/056419, 1 page.
International Search Report, dated Jan. 9, 2017, in counterpart International Application No. PCT/US2016/056419, 2 pages.

* cited by examiner

CONTINUAL LEARNING IN SLOWLY-VARYING ENVIRONMENTS

BACKGROUND

This disclosure relates generally to continual learning in slowly-varying environments, and more particularly, to providing an optimized action to an external system.

Many real-world situations involve sequential decision making where a decision making agent interacts with a stochastic environment. Typically at any time, the decision agent has a choice of actions to perform. Every time the agent performs an action, the environment provides a response (i.e. a reward), or an evaluative feedback, to the decision agent. For example, in order to maximize the time a user spends on a news website, a news website chooses to show particular content to the user and personalize the user's experience. In this case, the environment's response is the amount of time spent on the website by that user. In another example, in order to increase the amount of items a customer purchases from a store's website, an online retailer chooses a set of items to show the user on the landing page. In this case, the environment's response is the dollar amount of the purchases made by that user.

In addition to providing a response for an action performed by the decision agent, the environment can transition to a new state depending on the action performed by the decision agent. Typically, in a stochastic environment, even for the same state-action pair, the response of the environment is random but conforms to some underlying probability distribution. Additionally, the next state of the environment given a current state and action can be random with an underlying probability distribution. Assuming the environment is in an initial state, an action performed by the decision agent may affect not only the next state of the environment, but also all future states of the environment at subsequent time steps. The action performed at the initial state may affect not only the response received at the next step but also all future responses from the environment at subsequent time steps.

The response may be represented as a numerical value to reflect the response's desirability to the decision agent. To determine a maximized value of current and future responses, the decision agent may construct a policy to determine the best action at any given state.

Prior techniques, such as reinforcement learning, to construct desirable policies or models through interaction with the environment involve using a simple lookup table in cases where the state space is discrete and finite or a more sophisticated paradigm that uses function approximation methods such as decision trees or neural networks when the state space is continuous. In other techniques, such as an offline method, a model is built through offline processing of previously collected training data, which the decision agent later uses in live systems to make all future decisions. This offline method may be known as a "train once and use forever" paradigm. In yet other techniques, such as a batch update method that occurs online, the model is not updated after each interaction between the decision agent and the environment. Rather, the model is updated after a certain amount of time has elapsed or a certain amount of transactions have been completed. In this technique, the step size used by the learning algorithm to change the model parameters is gradually decreased, in which the model does not change after a sufficient time has elapsed. In this regard, this technique is similar to the offline method.

These prior techniques work well when the behavior of the environment does not change over time. However, typically in practice, the environment changes slowly over time relative to the rate of interaction between the decision agent and the environment. For example, clothing styles gradually change over several years whereas clothing retailers interact with customers on a daily basis.

SUMMARY

In some exemplary embodiments, an apparatus configured to continually learn includes: at least one memory operable to store program instructions; at least one processor operable to read the stored program instructions; and according to the stored program instructions, the at least one processor is configured to be operated as: a decision engine configured to receive one or more action requests from a decision agent, and to select a model providing an optimized action; an orchestrator configured to deploy a first model to a decision engine, to initiate an observation period, and to initiate a test period; a model builder configured to build a second model, wherein the second model comprises collected transaction data from the observation period; and an evaluator configured to determine a performance score for the first model and a performance score for the second model.

In other exemplary embodiments, a continual learning method, implemented by one or more processors, includes: receiving one or more action requests from a decision agent; deploying a first model to a decision engine; initiating an observation period; building a second model, in which the second model comprises collected transaction data from the observation period; initiating a test period; determining a performance score for the first model and a performance score for the second model; and selecting the model providing an optimized action.

In yet other exemplary embodiments, a non-transitory computer readable storage medium, implemented by one or more processors, storing a continual learning system for causing a computer to function as: a decision engine configured to receive one or more action requests from a decision agent, and to select a model providing an optimized action; an orchestrator configured to deploy a first model to a decision engine, to initiate an observation period, and to initiate a test period; a model builder configured to build a second model, wherein the second model comprises collected transaction data from the observation period; and an evaluator configured to determine a performance score for the first model and a performance score for the second model.

DETAILED DESCRIPTION

Exemplary embodiments of the present invention relate generally to continual learning in slowly-varying environments, and more particularly, to providing an optimized action to an external system. Exemplary embodiments recognize without such a system to continually learn, human intervention and expertise is needed to monitor and adapt to changes in the environment. Exemplary embodiments for continual learning when the behavior of the environment varies slowly with time are described below with references to FIGS. 1-3.

Implementation of such exemplary embodiments may take a variety of forms, and exemplary implementation details are discussed subsequently with reference to the Figures.

Figure 1:
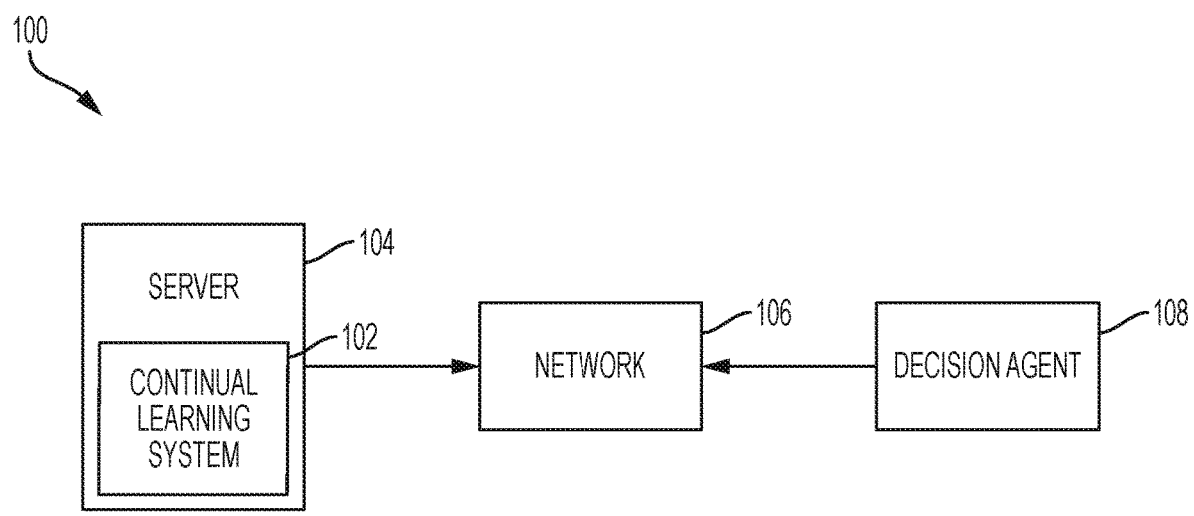
FIG. 1 is a functional block diagram illustrating a data processing environment, according to an exemplary embodiment.

FIG. 1 is a functional block diagram illustrating a data processing environment 100, according to an exemplary embodiment. FIG. 1 provides an illustration of one implementation of the subject matter and does not imply any limitations in which different exemplary embodiments of the data processing environment may be implemented. Many modifications to the depicted data processing environment may be made by those skilled in the art without departing from the scope and range of equivalents of the subject matter. In some exemplary embodiments, data processing environment 100 includes a network 106, a server 104, which operates continual learning system 102, and a decision agent 108.

Network 106 interconnects server 104 and decision agent 108. In general, network 106 can be any combination of connections and protocols capable of supporting communications between server 104, decision agent 108, and continual learning system 102. Network 106 can include wire cables, wireless communication links, fiber optic cables, routers, switches, firewalls, or any combination that can include wired, wireless, or fiber optic connections known by those skilled in the art.

Server 104 can be a web-based server hosting continual learning system 102, in accordance with exemplary embodiments of the present invention. In one exemplary embodiment, server 104 can be any programmable electronic device or computing system capable of receiving and sending data, via network 106, and performing computer-readable program instructions known by those skilled in the art. In some exemplary embodiments, server 104 can include a data storage repository (not shown) for storing data including, but not limited to, state information for all entities associated with an environment, transaction data, and various models or policies. Data storage repository can be any programmable electronic device or computing system capable of receiving, storing, and sending files and data, and performing computer readable program instructions capable of communicating with server 104 and decision agent 108, via network 106. In some exemplary embodiments, server 104 can be a cluster of computer nodes, in the distributed system, operating continual learning system 102, via network 106. In an exemplary embodiment, server 104 includes databases (not shown) that provides a service to external systems. In another exemplary embodiment, continual learning system 102 resides locally on server 104. In yet another exemplary embodiment, continual learning system 102 resides locally on one or more computer nodes.

In some exemplary embodiments, server 104 includes continual learning system 102 that utilizes components or models in order to select and provide an optimized action to decision agent 108. For example, continual learning system 102 utilizes a decision engine 202 to perform various functions for receiving one or more action requests from a decision agent 108. Continual learning system 102, utilizing the decision engine 202, can select a model providing an optimized action. Continual learning system 102, utilizing orchestrator 212, can deploy a first model to the decision engine 202, initiate an observation period, and initiate a test period. In another example, continual learning system 102 utilizes a model builder 210 to build the second model. In a final example, continual learning system 102 utilizes an evaluator 214 to determine a performance score for the first model and a performance score for the second model.

In some exemplary embodiments, continual learning system 102 operates on a central server, such as server 104, and can be utilized by one or more decision agents, such as decision agent 108, via a mobile application downloaded from the central server or a third-party application store, and executed on the one or more decision devices. In another exemplary embodiment, continual learning system 102 may be a software-based program, downloaded from a central server, such as server 104, and installed on one or more decision agents, such as decision agent 108. In yet another exemplary embodiment, continual learning system 102 can be utilized as a software service provided by a third-party cloud service provider (not shown).

In some exemplary embodiments, decision agent 108 is an agent to the server 104 and can be for example, a desktop computer, a laptop computer, a smart phone, or any other electronic device or computing system, known by those skilled in the art, capable of communicating with the server 104 through the network 106. For example, decision agent 108 may be a laptop computer capable of connecting to a network, such as network 106, to access continual learning system 102 and to provide requests for actions and rewards. In other exemplary embodiments, decision agent 108 can be any suitable types of mobile devices capable of running mobile applications or a mobile operating system.

In an exemplary embodiment, decision agent 108 interacts with an environment (e.g. a clothing retailer website or a news website). Decision agent 108 may request continual learning system 102 for an action. In another exemplary embodiment, decision agent 108 may provide the state of the environment (e.g. the duration of a user on articles of the news website, or the dollar amount of clothing purchases by a user) in the request. It can also be appreciated by those skilled in the art that decision agent 108 can provide an identifier of the entity corresponding to the request in lieu of the state of the environment.

Figure 2:
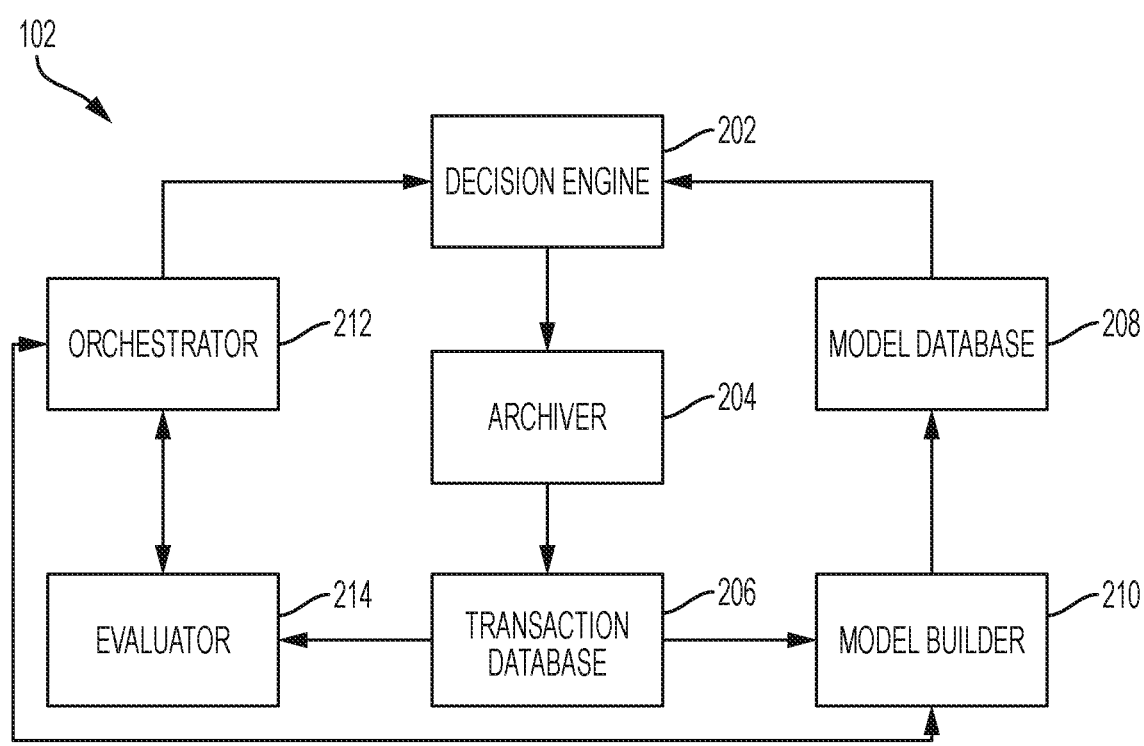
FIG. 2 is a functional block diagram depicting components of a continual learning system, according to an exemplary embodiment.

FIG. 2 is a functional block diagram depicting components of continual learning system 102, according to an exemplary embodiment. In some exemplary embodiments, the components reside locally with continual learning system 102. In another exemplary embodiments, the components, either individually or collectively, reside remotely from continual learning system 102 and are connected to continual learning system 102, via network 106.

In some exemplary embodiments, Decision Engine 202 receives a request for an action from Decision Agent 108. Decision Engine 202 retrieves parameters associated with a model from Model Database 208. Model Builder 210 builds a first model offline which it seeds to Model Database 208. Responsive to receiving a request for an action, Decision Engine 202 consults the current model and provides a recommended action to Decision Agent 108. Decision Agent 108 performs the recommended Action. In response to the performed action in the environment, Decision Agent 108 provides a response/reward to continual learning system 102.

In some exemplary embodiments, Decision Engine 202 notifies Archiver 204 that an action has been sent to Decision Agent 108 and Decision Agent 108 sent a response to the action. Archiver 204 writes transaction information to Transaction Database 206. In other exemplary embodiments, Archiver 204 can buffer transactions until a time or size limit is reached and then write to Transaction Database 206 in a bulk fashion.

In some exemplary embodiments, Orchestrator 212 is the central coordinator of continual learning system 102. Orchestrator 212 may contain one or more parameters, in which the parameters consist of an observation period and a test period. Orchestrator 212 may initiate the observation period and the test period. In an exemplary embodiment, the observation period may be the amount of time Decision Engine 202 uses a first model to prescribe actions for requests from Decision Agent 108. Archiver 204 writes transaction data to Transaction Database 206 during the observation period. In an exemplary embodiment, the test period is the amount of time Decision Engine 202 uses the first model and a second model to prescribe actions for requests from Decision Agent 108. In other exemplary embodiments, Decision Engine 202 can use more than two models during the test period. In yet other exemplary embodiments, Orchestrator 212 can be configured with a parameter to indicate the relative split of traffic across the models used during the test period, a parameter to specify the confidence level when comparing the performance of different models, and a parameter corresponding to the desired threshold to compare the difference in the average performance of models.

In some exemplary embodiments, Orchestrator 212 initiates Model Builder 210 to build models. Model Builder 210 may be executed at any time. In an exemplary embodiment, Model Builder 210 reads transaction data from Transaction Database 206 and trains a new model through various machine learning techniques for reinforcement learning known in the art, such as. Q-Learning, SARSA, and SARSA (λ). Model Builder 104 stores the new model in Model Database 208 after one is created.

In some exemplary embodiments, evaluator 214 can be at least one of an A/B Testing Evaluator, a Bandit Evaluator, or a Simulation Evaluator. In an exemplary embodiment in which Evaluator 214 implements an A/B Testing Evaluator, Evaluator 214 reads transaction data from Transaction Database 206 and compares the performance of the models in use during the test period using statistical hypothesis testing methods. In another exemplary embodiment in which Evaluator 214 implements a Bandit Evaluator, Evaluator 214 uses a two-arm or multi-arm Bandit approach to prescribe changes to the relative weights associated with each of the models being tested during the test period. In yet another exemplary embodiment in which Evaluator 214 implements a Simulation Evaluator, Evaluator 214 reads transaction data from Transaction Database 206, builds a model of the environment, and compares the performance of alternative models by testing them in the simulated environment.

Figure 3:
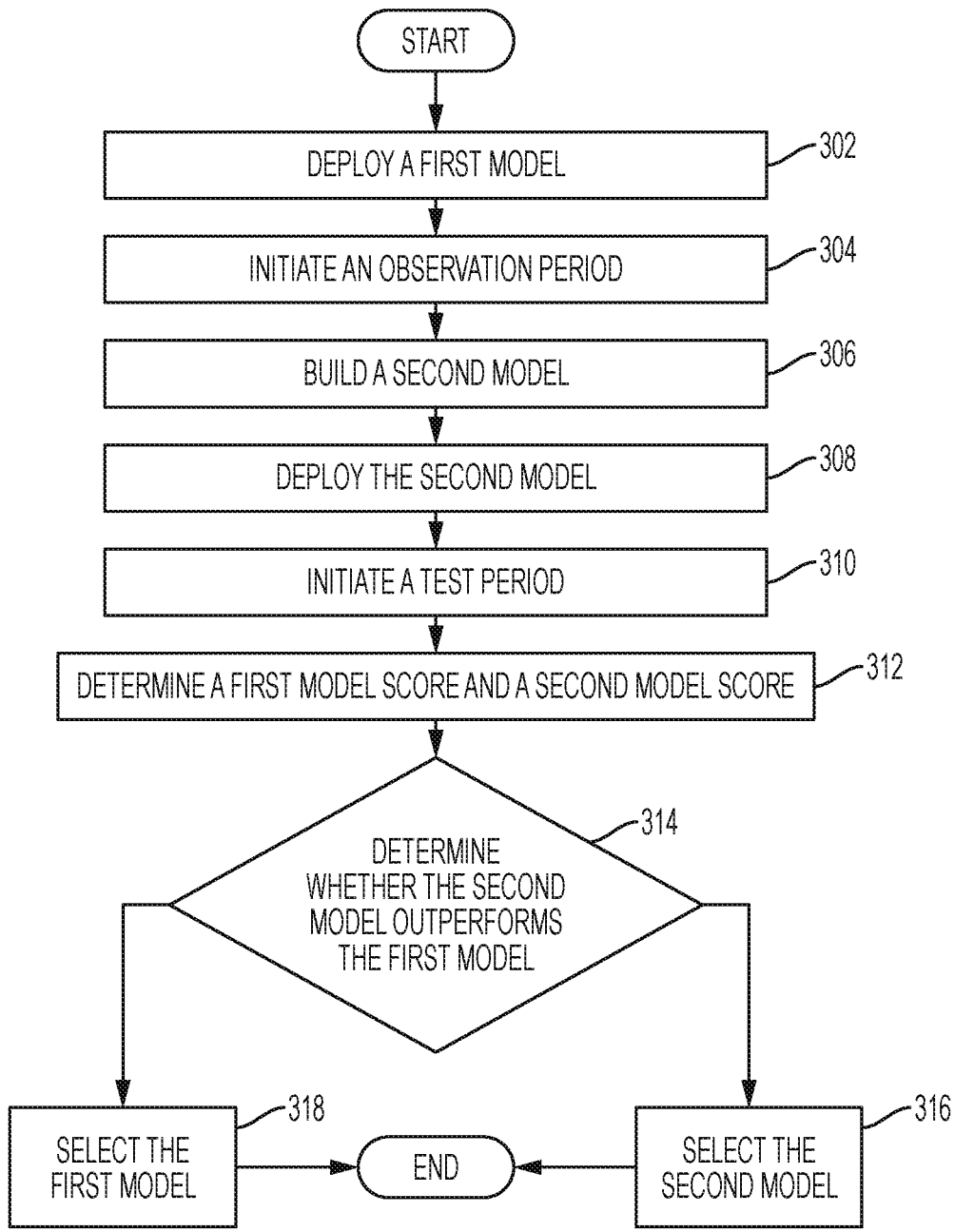
FIG. 3 is a flowchart illustrating operational steps of a continual learning system (such as the continual learning system of FIG. 1), according to an exemplary embodiment.

FIG. 3 is a flowchart illustrating operational steps of continual learning system 102, generally designated 300, according to an exemplary embodiment. In some exemplary embodiments discussed herein, decision agent 108 can initiate continual learning system 102 by connecting to server 104 via network 106. Continual learning system 102 implements the operational steps utilizing the components of continual learning system 102, referring to FIG. 2 discussed above.

Orchestrator 212 deploys a first model (302). In some exemplary embodiments, Orchestrator 212 retrieves a first model from Model Database 208 and deploys the first model, for example an initial seed model, to Decision Engine 202. Model Builder 210 may build the first model offline using transaction data collected from a legacy system, transaction data generated from a rule-based system designed by human experts, or any other method known in the art that uses available information. Model Builder 210 may store the first model in Model Database 208. In some exemplary embodiments, the first model may be referred to as model A.

Orchestrator 212 initiates an observation period (304). In some exemplary embodiments, Orchestrator 212 initiates the observation period using an observation period parameter. The observation period may be configured for a predetermined time period (e.g. an hour, a day, two weeks, a year). During the observation period, decision engine 202 services requests from Decision Agent 108 using the first model. Archiver 204 writes transaction data, regarding the requested services in the observation period (i.e. requested actions, actions, responses/rewards to the provided actions), to Transaction Database 206.

In some exemplary embodiments, during the observation period, continual learning system 102 periodically "wakes up" to determine if the observation period has expired. If continual learning system 102 determines the observation period has not expired, continual learning system goes back to "sleep" until the next predetermined polling time interval to determine if the observation period has expired. If continual learning system 102 determines the observation period has expired, continual learning system 102 proceeds as described below.

Responsive to the observation period ending, Model Builder 210 builds a second model (306). In some exemplary embodiments, Model Builder 210 builds a second model using transaction data collected during the observation period and stored in Transaction Database 206. In an exemplary embodiment, the second model may be referred to as model B. In other exemplary embodiments, Model Builder 210 builds more than one new model.

Orchestrator 212 deploys the second model (308). In some exemplary embodiments, Orchestrator 212 retrieves the second model from Model Database 208 and deploys the second model to Decision Engine 202. In some exemplary embodiments, Orchestrator 212 deploys the second model to a percentage of users of Decision Agent 108. For example, the first model can be configured to 80% of the users and the second model can be applied to the remaining 20% of the users. In another exemplary embodiment, Orchestrator 212 deploys the second model to all users of Decision Agent 108.

Responsive to a second model being deployed, Orchestrator 212 initiates a test period (310). In some exemplary embodiments, Orchestrator 212 initiates the test period using a test period parameter. The test period may be configured for a predetermined time period (e.g. an hour, a day, two weeks, a year). During the test period, decision engine 202 services requests from Decision Agent 108 using the first model and second model. Archiver 204 writes transaction data, regarding the requested services in the test period (i.e. action requests, actions, responses/rewards to the provided actions), to Transaction Database 206. In an exemplary embodiment, a transaction data log entry may include a model identifier to uniquely identify the model used in the corresponding transaction.

In some exemplary embodiments, during the test period, continual learning system 102 periodically "wakes up" to determine if the test period has expired. If continual learning system 102 determines the test period has not expired, continual learning system goes back to "sleep" until the next predetermined polling time interval to determine if the test period has expired. If continual learning system 102 determines the test period has expired, continual learning system 102 proceeds as described below.

Responsive to the test period ending, continual learning system 102 determines a first model score and a second model score (312). In some exemplary embodiments, Continual learning system 102 utilizes Evaluator 214 to determine the first model score and the second model score. Evaluator 214 can be an A/B testing evaluator, a bandit evaluator, or a simulation evaluator.

In an exemplary embodiment, in which Evaluator 214 implements an A/B Testing Evaluator, Evaluator 214 processes transaction data from Transaction Database 206 and computes a binary decision as to whether model B (i.e. the second model) is statistically better than model A (i.e. the first model). For example, Evaluator 214 can implement statistical hypothesis testing techniques such as Student's t-test, Welch's t-test, or any other hypothesis testing method known in the art. In another exemplary embodiment, Evaluator 214 can also test a hypothesis, in which model B is better than model A by a predetermined threshold (i.e. a magnitude) in the A/B Testing Evaluator.

Decision Engine 202 determines whether the second model outperforms the first model (decision block 318). If Decision Engine 202 determines the second model outperforms the first model (decision block 314, "YES" branch), the Decision Engine 202 selects the second model (316) and ends. In an exemplary embodiment, when model B statistically outperforms model A in A/B hypothesis testing, Decision Engine 202 replaces model B with model A. For the cases when Decision Engine 202 does not determine whether the second model outperforms the first model (decision block 314, "NO" branch), Decision Engine 202 selects the first model (318) and ends. In an exemplary embodiment, when Decision Engine 202 cannot determine whether model B outperforms model A, Decision Engine 202 discards model B and applies model A to all users.

In another exemplary embodiment, Evaluator 214 implements a bandit evaluator. Evaluator 214 implements a two-armed or multi-armed bandit approach to evaluate the first model and second model. Orchestrator 212 dynamically allocates a percentage of traffic (i.e. action requests) to the first and second models throughout the test period. If the desired confidence level is reached within the test period, Decision Engine 202 selects the second model for all users. For the cases in which the second model does not reach the desired confidence level, Decision Engine 202 selects the first model for all users.

In yet another exemplary embodiment, Evaluator 214 implements a simulation evaluator. For the cases in which Evaluator 214 implements a simulation evaluator, continual learning system 102 does not deploy the second model to Decision Engine 202 during the test period. Rather, Evaluator 214 tests the performance of the second model by comparing it to the performance of the first model in a simulated environment. In an exemplary embodiment, Evaluator 214 builds a simulation of an environment and decision agent 108 using transaction data stored in Transaction Database 206, in which the initial states are the states of users (e.g. the number of times a user has visited a website, the dollar amount of purchases made by the user, etc.) at the end of the observation period. In an exemplary embodiment, Evaluator 214 simulates a predetermined number of steps for the first and second model for each user. Evaluator 214 determines the average cumulative net rewards for each model at the end of the last step of each simulation run. Decision Engine 202 determines whether the average cumulative net rewards of the second model outperform the average cumulative net rewards of the first model. If Decision Engine 202 determines the second model outperforms the first model, the Decision Engine 202 selects the second model and ends. For the cases when Decision Engine 202 does not determine whether the second model outperforms the first model, Decision Engine 202 selects the first model and ends.

In some exemplary embodiments, Evaluator 214 implements two or more evaluators in sequence. For example, Evaluator 214 implements a simulation evaluator, and Evaluator 214 may then implement an A/B Testing Evaluator for Decision Engine 202 to determine whether the second model outperforms the first model.

Although the subject matter has been described in terms of exemplary embodiments, it is not limited thereto. Rather, the appended claims should be construed broadly, to include other variants and exemplary embodiments, which may be made by those skilled in the art without departing from the scope and range of equivalents of the subject matter.

What is claimed is:

1. An apparatus configured to continually learn, the apparatus comprising:
   at least one memory configured to store program instructions;
   at least one processor configured to read the stored program instructions; and
   according to the stored program instructions, the at least one processor is configured to be operated as:
   a decision engine configured to receive one or more action requests from a decision agent, and to select a model providing an optimized action;
   an orchestrator configured to deploy a first model to the decision engine, to initiate an observation period, and to initiate a test period;
   a model builder configured to build a second model, wherein the second model comprises collected transaction data from the observation period; and
   an evaluator configured to determine a first performance score for the first model and a second performance score for the second model by:
   using a bandit evaluation of the first model and the second model, wherein the using the bandit evaluation includes assigning a first percentage of traffic to the first model and a second percentage of traffic to the second model, and
   determining the first performance score based on a first average cumulative net reward of the first model, wherein the first average cumulative net reward of the first model is based in part on a first duration of a first user reading first articles of a news website, and determining the second performance score based on a second average cumulative net reward of the second model, wherein the second average cumulative net reward of the second model is based in part on a second duration of a second user reading second articles of the news website, and the first duration and the second duration are obtained from a transaction database,
   wherein the evaluator is further configured to select the second model when the second average cumulative net reward exceeds the first average cumulative net reward.

2. The apparatus of claim 1, wherein:
   the orchestrator is further configured to deploy the second model to the decision engine, the first model being deployed to a first set of one or more users and the second model being deployed to a second set of one or more users; and the decision engine is further configured to provide the optimized action to the decision agent.

3. The apparatus of claim 1, wherein:
the decision engine is further configured to service one or more action requests from the decision agent during the test period; and
an archiver configured to store transaction data, wherein transaction data comprises at least one or more action requests, one or more optimized actions, or responses to the one or more optimized actions.

4. The apparatus of claim 1, wherein:
the evaluator is further configured to determine transaction data of the first model and the second model from the test period; and
the evaluator is further configured to determine the first model performance score and the second model performance score using a statistical hypothesis test.

5. The apparatus of claim 1, wherein the orchestrator is further configured to store one or more parameters, wherein a parameter comprises at least one of a parameter to indicate a relative split of traffic across the first model and the second model, and a parameter to specify a confidence level when comparing a performance of the first model and the second model.

6. The apparatus of claim 1, wherein the model builder is further configured to build the first model using transaction data collected from a legacy system or generated from a rule-based system.

7. A continual learning method, implemented by one or more processors, the continual learning method comprising:
receiving one or more action requests from a decision agent;
deploying a first model to a decision engine;
initiating an observation period;
building a second model, wherein the second model comprises collected transaction data from the observation period;
initiating a test period;
determining a first performance score for the first model and a second performance score for the second model, wherein the determining comprises:
using a bandit evaluation of the first model and the second model, wherein the bandit evaluation includes assigning a first percentage of traffic to the first model and a second percentage of traffic to the second model,
determining the first performance score based on a first average cumulative net reward of the first model, wherein the first average cumulative net reward of the first model is based in part on a first duration of a first user reading first articles of a news website, and determining the second performance score based on a second average cumulative net reward of the second model, wherein the second average cumulative net reward of the second model is based in part on a second duration of a second user reading second articles of the news website, and the first duration and the second duration are obtained from a transaction database; and
selecting the second model when the second average cumulative net reward exceeds the first average cumulative net.

8. The method of claim 7, further comprising:
deploying the second model to the decision engine, wherein the first model is deployed to a first set of one or more users and the second model is deployed to a second set of one or more users; and
providing an optimized action to the decision agent.

9. The method of claim 7, further comprising:
servicing one or more action requests from the decision agent during the test period; and
storing transaction data, wherein transaction data comprises at least one or more action requests, one or more optimized actions, or responses to the one or more optimized actions.

10. The method of claim 7, wherein determining the performance score for the first model and the performance score for the second model comprises:
determining transaction data of the first model and the second model from the test period;
determining the first performance score and the second performance score using a statistical hypothesis test.

11. A non-transitory computer readable storage medium, implemented by one or more processors, storing a continual learning system configured to cause a computer to:
receive one or more action requests from a decision agent;
deploy a first model to a decision engine;
initiate an observation period;
build a second model, wherein the second model comprises collected transaction data from the observation period;
initiate a test period;
determine a first performance score for the first model and a second performance score for the second model, by:
using a bandit evaluation of the first model and the second model, wherein the bandit evaluation includes assigning a first percentage of traffic to the first model and a second percentage of traffic to the second model,
determining the first performance score based on a first average cumulative net reward of the first model, wherein the first average cumulative net reward of the first model is based in part on a first duration of a first user reading first articles of a news website, and determining the second performance score based on a second average cumulative net reward of the second model, wherein the second average cumulative net reward of the second model is based in part on a second duration of a second user reading second articles of the news website, and the first duration and the second duration are obtained from a transaction database; and
select the second model when the second average cumulative net reward exceeds the first average cumulative net reward.

12. The non-transitory computer readable storage medium of claim 11, wherein the continual learning system is further configured to cause a computer to:
deploy the second model to the decision engine, the first model being deployed to a first set of one or more users and the second model being deployed to a second set of one or more users; and
the decision engine is further configured to provide an optimized action to the decision agent.

13. The non-transitory computer readable storage medium of claim 11, wherein the continual learning system is further configured to cause the computer to:
service one or more action requests during the test period; and
store transaction data, wherein transaction data is comprised of at least one or more action requests, one or more optimized actions, or responses to the one or more optimized actions.

14. The non-transitory computer readable storage medium of claim 11, wherein the continual learning system is further configured to cause the computer to:
   determine transaction data of the first model and the second model from the test period; and
   determine the first performance score and the second performance score using a statistical hypothesis test.

* * * * *